(12) United States Patent
Rowlands et al.

(10) Patent No.: US 7,076,586 B1
(45) Date of Patent: Jul. 11, 2006

(54) DEFAULT BUS GRANT TO A BUS AGENT

(75) Inventors: Joseph B. Rowlands, Santa Clara, CA (US); Shailendra S. Desai, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 403 days.

(21) Appl. No.: 09/680,757

(22) Filed: Oct. 6, 2000

(51) Int. Cl.
*G06F 13/36* (2006.01)

(52) U.S. Cl. ...................... 710/113; 710/309
(58) Field of Classification Search ............... 710/125, 710/200, 220, 240, 241, 242, 243, 244
See application file for complete search history.

(56) References Cited

U.S. PATENT DOCUMENTS

| | | | |
|---|---|---|---|
| 4,257,095 A | | 3/1981 | Nadir |
| 5,045,997 A | | 9/1991 | Watanabe |
| 5,151,994 A | | 9/1992 | Wille et al. |
| 5,168,568 A | * | 12/1992 | Thayer et al. ............... 710/125 |
| 5,265,223 A | | 11/1993 | Brockmann et al. |
| 5,301,282 A | * | 4/1994 | Amini et al. ................ 710/113 |
| 5,509,125 A | | 4/1996 | Johnson et al. |
| 5,594,876 A | * | 1/1997 | Getzlaff et al. .............. 710/241 |
| 5,710,891 A | | 1/1998 | Normoyle et al. |
| 5,867,675 A | * | 2/1999 | Lomelino et al. ............ 710/240 |
| 5,987,549 A | * | 11/1999 | Hagersten et al. ........... 710/107 |
| 6,021,451 A | | 2/2000 | Bell et al. |
| 6,038,624 A | | 3/2000 | Chan et al. |
| 6,076,132 A | * | 6/2000 | Chen ........................ 710/241 |
| 6,092,137 A | | 7/2000 | Huang et al. |
| 6,173,349 B1 | * | 1/2001 | Qureshi et al. .............. 710/110 |
| 6,199,133 B1 | | 3/2001 | Schnell |
| 6,321,309 B1 | | 11/2001 | Bell et al. |

FOREIGN PATENT DOCUMENTS

| | | |
|---|---|---|
| EP | 0497054 A2 | 8/1992 |
| WO | WO 00/34876 A | 6/2000 |

OTHER PUBLICATIONS

*PowerPC™ 601, RISC Microprocessor User's Manual*, 6 pgs., © Motorola, Inc. 1993.
Halfhill, "SiByte Reveals 64-Bit Core for NPUs," Microprocessor Report, Jun. 2000, pp. 45-48.
*Pentium® Pro Family Developer's Manual*, vol. 1: Specifications, Chapter 4, pp. 1-18, 1996.
EP Search Report for EP app 01308531.1, Broadcom Corp.
EP Search Report for EP app 01308533.7, Broadcom Corp.

* cited by examiner

*Primary Examiner*—Tim Vo
(74) *Attorney, Agent, or Firm*—Garlick Harrison & Markison LLP (57) ABSTRACT

A system may include two or more agents, one of which may be identified as a default agent. If none of the agents arbitrate for the bus, the default agent may be given a default grant of the bus. If the default agent has information to transfer on the bus, the default agent may take the default grant and my transfer the information without first arbitrating for the bus and winning the arbitration. In one embodiment, the default agent may arbitrate for the bus when it has information to transfer and no default grant is received. The default agent may be an equal participant in arbitration. A fair arbitration scheme may thus be implemented in arbitrations in which there is contention for the bus.

34 Claims, 7 Drawing Sheets

DEFAULT BUS GRANT TO A BUS AGENT

BACKGROUND OF THE INVENTION

1. Field of the Invention

This invention is related to the field of digital systems and, more particularly, to arbitration mechanisms for buses within such systems.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus a mechanism for determining which agent is permitted to use the bus at any given time is needed. Generally, determining which of several agents is permitted to use the bus (often referred to as "mastering the bus") is referred to as "arbitration". An agent desiring to use the bus may signal its request to use the bus, referred to as "arbitrating". The circuitry for performing arbitration is referred to as an "arbiter". One or more agents may arbitrate for the bus, and the arbiter determines which of the arbitrating agents is permitted to use the bus. The agent granted use of the bus by the arbiter is referred to as the winner of the arbitration.

Unfortunately, arbitrating for the bus to perform a transfer may add latency to that transfer. For certain low latency agents, the overhead for performing the arbitration may be a significant increase to the latency of the transfer.

SUMMARY OF THE INVENTION

The problems outlined above are in large part solved by a default bus grant system as described herein. The system may include two or more agents, one of which may be identified as a default agent. If none of the agents arbitrate for the bus, the default agent may be given a default grant of the bus. If the default agent has information to transfer on the bus, the default agent may take the default grant and my transfer the information without first arbitrating for the bus and winning the arbitration. The default agent may, on average, experience a lower latency for transferring information dependent on the number of default grants received while the default agent has information to transfer. If the agent is a low latency agent, the lower latency provided via the default grant may be a substantial improvement. Additionally, bus bandwidth may be more efficiently used if the default agent uses a default grant, since the bandwidth corresponding to the default grant might otherwise go unused.

In one embodiment, the default agent may arbitrate for the bus when it has information to transfer and no default grant is received. The default agent may be an equal participant in arbitration. A fair arbitration scheme may thus be implemented in arbitrations in which there is contention for the bus.

Broadly speaking, a system is contemplated comprising a bus and a plurality of agents coupled thereto. Each of the plurality of agents is configured to arbitrate for the bus. A predetermined first agent of the plurality of agents is a default winner of an arbitration if none of the plurality of agents arbitrates for the bus during the arbitration.

Additionally, an arbiter for a bus is contemplated. The arbiter includes a first circuit coupled to receive a plurality of request signals, each of the plurality of request signals corresponding to a respective agent of a plurality of agents coupled to the bus and indicative of whether or not the respective agent is arbitrating for the bus. The first circuit is configured to grant use of the bus to a first agent if none of the plurality of agents is arbitrating for the bus. The first agent is predetermined to be granted use of the bus if none of the plurality of agents is arbitrating for the bus.

Moreover, a method is contemplated. Use of a bus is granted to a first agent of a plurality of agents responsive to none of the plurality of agents arbitrating for the bus. The first agent is predetermined to be granted use of the bus if none of the plurality of agents is arbitrating for the bus.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
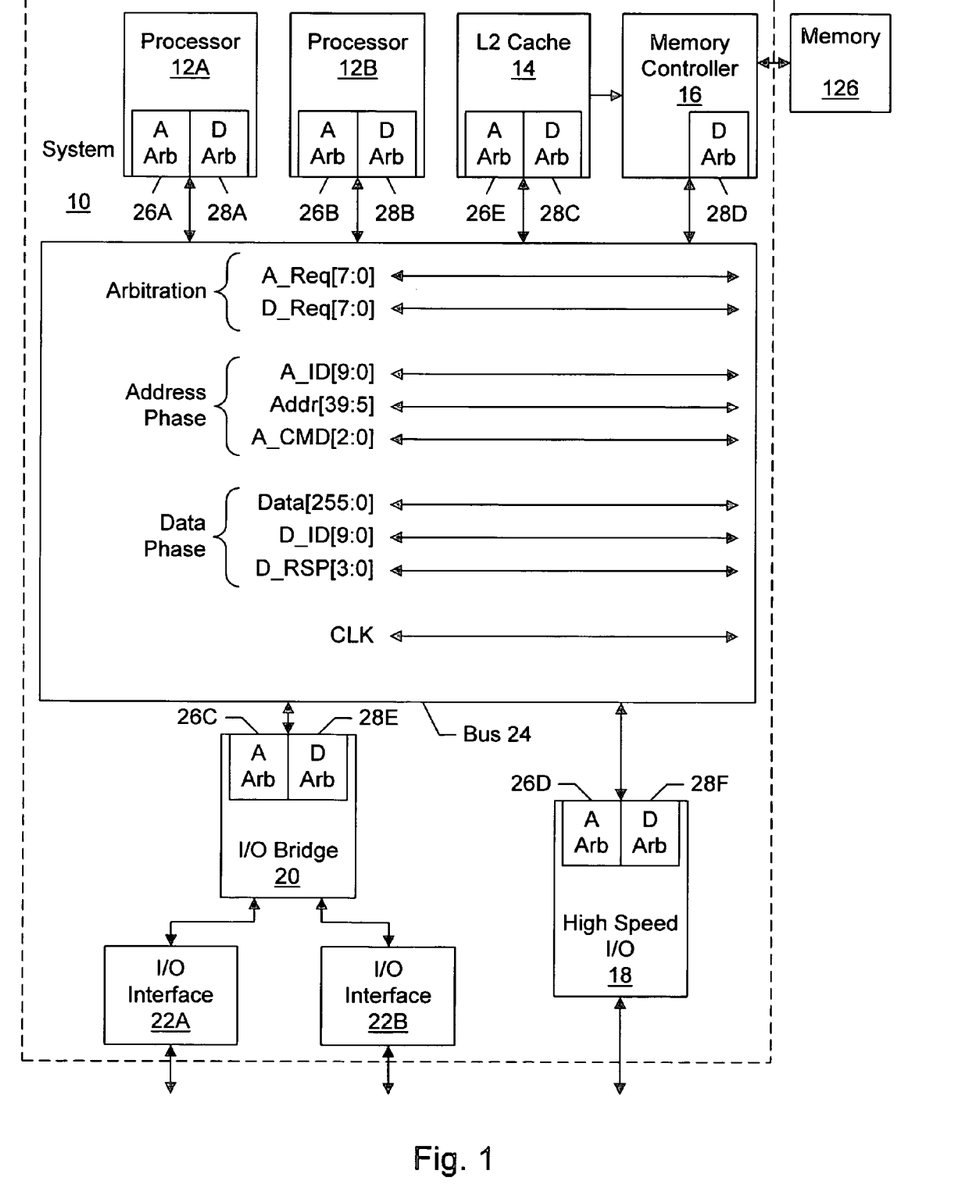
FIG. 1 is a block diagram of one embodiment of a system.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, and I/O interfaces 22A–22B.

System 10 may include a bus 24 for interconnecting the various components of system 10. As illustrated in FIG. 1, each of processors 12A–12B, L2 cache 14, memory controller 16, high speed I/O bridge 18 and I/O bridge 20 are coupled to bus 24. Each of processors 12A–12B, high speed I/O bridge 18, I/O bridge 20, and L2 cache 14 include an address bus arbiter (A Arb) labeled with reference numerals 26A–26E as illustrated in FIG. 1. Each of processors 12A–12B, L2 cache 14, memory controller 16, high speed I/O bridge 18, and I/O bridge 20 include a data bus arbiter (D Arb) labeled with reference numerals 28A–28F as illustrated in FIG. 1. I/O bridge 20 is coupled to I/O interfaces 22A–22B. L2 cache 14 is coupled to memory controller 16, which is further coupled to a memory 126.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus and data bus are independently arbitrated for, allowing for out of order data phases with respect to the corresponding address phases. Each transaction including both address and data thus includes an arbitration for the address bus, an address phase on the address bus, an arbitration for the data bus, and a data phase on the data bus. Additionally, coherent transactions may include a response phase for communicating coherency information after the address phase.

Various signals included in bus 24 are illustrated in FIG. 1, including arbitration signals, address phase signals, and data phase signals. The arbitration signals include a set of address request signals (A_Req[7:0]) used by each requesting agent to arbitrate for the address bus and a set of data request signals (D_Req[7:0]) used by each responding agent to arbitrate for the data bus. The address phase signals include an address bus used to provide the address of the transaction (Addr[39:5]), a command (A_CMD[2:0]) used to indicate the transaction to be performed (read, write, etc.), and a transaction ID (A_ID[9:0]) used to identify the transaction. More particularly, the transaction ID may be used for read and write transactions to match the address phase with the subsequent data phase of the transaction. A portion of the transaction ID is an agent identifier identifying the requesting agent. For example, the agent identifier may be bits 9:6 of the transaction ID. Each agent is assigned a different agent identifier. The data phase signals include a data bus (Data [255:0]), a transaction ID (D_ID[9:0]) similar to the transaction ID of the address phase and used to match the address phase with the corresponding data phase, and a responder ID (D_RSP[3:0]). The responder ID is the agent identifier of the responding agent who arbitrated for the data bus to perform the data transfer. Additionally, bus 24 includes a clock signal (CLK) which carries a clock to which the bus signals are referenced. Both the address phase and the data phase may include other signals, as desired, such as the cacheability and coherency attributes of a transaction in the address phase and data error signals in the data phase.

An arbitrating agent for either the address bus or the data bus may be identified as a default agent to which the address bus or data bus, respectively, may be granted for arbitrations in which no agents arbitrate for the bus. Viewed in another way, the default agent may be a default winner of an arbitration in which no agents arbitrate for the bus. The default agent may be, for example, a low latency agent which may improve average latency by not having to arbitrate for some transfers if a default grant is given to the default agent and the default agent has information to transfer. For example, the default grant may occur during a bus cycle in which the default agent determines that it has information to transfer (and thus would have arbitrated for the bus in the next arbitration). Since the transfer occurs without arbitration, the latency introduced by the arbitration may be eliminated. In other embodiments, the default agent need not be a low latency agent. Such embodiments may experience increased efficiency in the use of bus bandwidth, since bandwidth which might otherwise go unused may be used by the default agent.

Since the default agent is predetermined, the granting of the bus to the default agent may be independent of other events. For example, the granting of the bus to the default agent may be independent of which agents have been previously granted the bus. The granting of the bus to the default agent may be independent of any priority scheme that may be used for arbitration when two or more agents are arbitrating. Particularly, the granting of the bus to the default agent may be independent of which of the agents was last to use the corresponding address or data bus.

If the default agent has information to transfer and does not receive a default grant, the default agent may arbitrate for the bus in a manner similar to other agents. More particularly, the default agent may be treated in the same manner as other agents by the arbitration scheme. For example, in one embodiment, a relative priority among the agents is maintained. If an agent wins an arbitration, it becomes lowest priority in the arbitration scheme. The default agent may be recorded in the priority scheme, as are the other arbitrating agents. Treating the default agent in a manner similar to the other agents for arbitration may be referred to as the default agent being an "equal arbitration participant". Since the default agent participates in arbitration normally, other agents may have fair access to the bus when there is contention for the bus among the agents.

In one implementation, L2 cache 14 may be a default agent for the data bus. L2 cache 14 may also be a low latency responding agent, capable of providing data rapidly in response to addresses which hit in L2 cache 14. For example, in one embodiment, L2 cache 14 may be capable of providing data 3 clock cycles (of the CLK clock) after the address is sampled. Other embodiments may be capable of providing data in fewer clock cycles or more clock cycles. Thus, the arbitration latency may be a significant contributor to increasing the latency of data transfers from L2 cache 14 (e.g. from 3 to 4 bus clock cycles). In cases that an arbitration for the data bus occurs and no responding agent arbitrates for the data bus, the arbitration mechanism of system 10 may, by default, grant the data bus to L2 cache 14. If L2 cache 14 has data to transfer, L2 cache 14 may take the data bus without arbitrating and transfer the data. Thus, latency for that transfer may be reduced by the amount of the arbitration time.

In one embodiment, bus 24 may use differential signalling and thus the bus may be driven each cycle that a device may be sampling the bus (to provide a differential that may be sampled correctly, even if the sampled information is logically invalid). For the data bus, L2 cache 14 may provide a driven value on the data bus with an indication that the data is invalid (e.g. an invalid signal, an invalid command encoding on two or more data command signals that may also be used to report errors, or an invalid transaction ID on D_ID[9:0]). Thus, a value may be sampled from the bus even if there is no data transfer at that time. Alternatively, agents may be configured to detect a valid signal which indicates whether data is being driven. In such embodiments, L2 cache 14 may drive the data bus in response to a default grant only if L2 cache 14 has data to transfer.

System 10 employs a distributed arbitration scheme in the illustrated embodiment, and thus each requesting agent includes an address arbiter 26A–26E and each responding agent includes a data arbiter 28A–28F. Each requesting agent is assigned an address request signal (one of A_Req [7:0]), and each responding agent is assigned a data request signal (one of D_Req[7:0]). More particularly, as mentioned above, each agent is assigned an agent identifier and the corresponding address request signal and/or data request signal may be used by that agent. For example, the agent identifier may be hardwired in each agent, or may be wired via input signals strapped to power or ground to form the agent identifier. In one exemplary implementation, processor 12A may be assigned agent identifier 0 (and thus may use A_Req[0] and D_Req[0]), processor 12B may be assigned agent identifier 1, high speed I/O bridge 18 may be assigned agent identifier 2, I/O bridge 20 may be assigned agent identifier 3, a system control and debug block (not shown) may be assigned agent identifier 4, L2 cache 14 may be assigned agent identifier 6, and memory controller 16 may be assigned agent identifier 7. In another alternative, agent identifiers may be programmable in each agent using configuration commands.

The fairness scheme implemented by one embodiment of system 10 may be one in which the agent granted the bus is made lowest priority for being granted the bus again. The highest priority agent which is requesting the bus is granted the bus. Since address and data buses are separately arbitrated, separate priority states are maintained for the address and data buses.

Each address arbiter 26A–26E is coupled to receive at least the address request signals (A_Req[7:0]) corresponding to each other requesting agent besides the requesting agent to which that address arbiter corresponds (the "corresponding agent"). For example, the corresponding agent of address arbiter 26A is processor 12A and address arbiter 26A receives the address request signals from each other agent (including the address request signals from processor 12B, I/O bridge 20, and high speed I/O bridge 18). The address arbiter tracks which of the agents are higher priority than the corresponding agent and which agents are lower priority than the corresponding agent for address bus arbitration (i.e. the relative priority of the corresponding agent to other agents). Thus, given the request signals from each other agent, the address arbiter can determine whether or not the corresponding agent wins the arbitration for the address bus. This determination may be relatively quick, and thus arbitration may be performed rapidly. Rather than attempt to calculate which other agent did win the arbitration, the address arbiter uses the agent identifier (A_ID[9:6]) in the address phase of the transaction performed by the arbitration winner to update the priority state for the corresponding agent. More particularly, the agent which won the arbitration is marked as lower priority than the corresponding agent. On the other hand, if the corresponding agent does win the arbitration, the address arbiter updates the priority state to indicate that each other agent is higher priority than the corresponding agent.

Each data arbiter 28A–28F is similarly coupled to receive at least the data request signals (D_Req[7:0]) corresponding to each other responding agent besides the responding agent to which that data arbiter corresponds. The data arbiter tracks which of the agents are higher priority than the corresponding agent and which agents are lower priority than the corresponding agent for data bus arbitration (i.e. the relative priority of the corresponding agent to other agents). Thus, given the request signals from each other agent, the data arbiter can determine whether or not the corresponding agent wins the arbitration for the data bus. This determination may be relatively quick, and thus arbitration may be performed rapidly. Rather than attempt to calculate which other agent did win the arbitration, the data arbiter uses the agent identifier (D_RSP[3:0]) in the data phase of the transaction performed by the arbitration winner to update the priority state for the corresponding agent. More particularly, the agent which won the arbitration is marked as lower priority than the corresponding agent. On the other hand, if the corresponding agent does win the arbitration, the data arbiter updates the priority state to indicate that each other agent is higher priority than the corresponding agent.

The data phase includes D_RSP[3:0] to provide the agent identifier because the transaction ID (D_ID[9:0]) is used to match the address phase and data phase of a transaction. Thus, the portion of the transaction ID identifying the initiating agent may not identify the data bus arbitration winner. Generally, the data bus is arbitrated for by the agent providing the data for a transaction. Thus, for read transactions, the responding agent arbitrates for the data bus. The requesting agent is identified in the transaction ID, but D_RSP[3:0] identifies the responding agent. For write transactions, the requesting agent arbitrates for the data bus. The requesting agent may arbitrate for the data bus in these cases and thus D_RSP[3:0] and D_ID[9:6] may carry the same value.

While the above description refers to an address or data arbiter receiving request signals from at least each other agent, in some embodiments the arbiter may receive the request signal for the corresponding agent as well. If the corresponding agent's request signal is not received, the grant generated by the arbiter may be qualified by the logic receiving the grant with the corresponding agent's request signal. In embodiments in which the corresponding agent's request signal is received by the arbiter, the grant may only be asserted if the corresponding agent's request signal is asserted. The receiving logic need not qualify the grant in this case.

For a distributed arbitration embodiment, the arbiter for the default agent may be configured to determine, in addition to the above description for the priority arbitration, that no agents are arbitrating during a given arbitration cycle, and may signal the default agent with a default grant if no agents are arbitrating. For example, in an embodiment in which L2 cache 14 is a default agent, the data arbiter 28C for L2 cache 14 may be configured to determine that no agents are arbitrating for the data bus during a given arbitration cycle. Data arbiter 28C may signal L2 cache 14 of a default grant if no agents are arbitrating. If L2 cache 14 has data to transfer, L2 cache 14 may take the data bus in response to the default grant and may transfer the data. During the transfer, L2 cache 14 may drive its agent identifier on D_RSP[3:0], thus causing the priority state in each arbiter to update in the same manner as when L2 cache 14 wins an arbitration (e.g. L2 cache 14 becomes lowest priority in the priority scheme). Other data arbiters 28A–28B and 28D–28F may not include circuitry for determining the default grant in such an embodiment.

Bus 24 may be pipelined. More particularly, the arbitration for the address bus may be pipelined with the address transfer itself. In other words, an address transfer may be occurring during a first clock cycle and arbitration for the address transfer to be performed in the next clock cycle may be performed during the first clock cycle. Similarly, a data transfer may be occurring during the first clock cycle and arbitration for the data transfer to be performed in the next clock cycle may be performed during the first clock cycle. Address transfers on bus 24 may be performed in a single cycle, as may data transfers (e.g. the data bus is a cache line wide in the illustrated embodiment). Other embodiments may use more than one clock cycle for the address transfer and/or the data transfer. Each arbitration may determine the agent which owns the bus for the number of clock cycles used to perform a transfer.

Bus 24 may employ any suitable signalling technique. For example, in one embodiment, each signal within bus 24 may be differential for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 126 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 126 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. I/O bridge 20 may serve to reduce the electrical loading on bus 24 if more than one I/O interface 22A–22B is bridged by I/O bridge 20. Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

It is noted that system 10 (and more particularly processors 12A–12B, L2 cache 14, memory controller 16, I/O interfaces 22A–22B, I/O bridge 20, I/O bridge 18 and bus 24 may be integrated onto a single integrated circuit as a system on a chip configuration. In another configuration, memory 126 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated.

It is noted that, while various bit ranges for signals are illustrated in FIG. 1 and other figures below, the bit ranges may be varied in other embodiments. The number of request signals, the size of the agent identifier and transaction ID, the size of the address bus, the size of the data bus, etc., may all be varied according to design choice.

It is noted that, while the illustrated embodiment employs a distributed arbitration scheme, other embodiments may employ a central arbitration scheme. The central arbitration circuit may receive the request signals from the agents, and may provide grant signals to each arbitrating agent. The central arbitration circuit may assert the grant signal to the arbitration winner. Additionally, for an arbitration in which no agent arbitrates, the central arbiter may assert the grant signal to the default agent.

It is noted that, while the present embodiment uses an arbitration scheme in which the winner of the arbitration becomes lowest priority for subsequent arbitrations, any arbitration scheme may be used, including fixed priority arbitration schemes, round robin schemes, etc.

It is noted that, while L2 cache 14 is used as an example of a default agent for the data bus in the above description, any agent may be a default agent. Furthermore, a default agent may not be a low latency agent, if desired.

It is noted that, while the present description uses data bus arbitration as an example having a default agent, address bus arbitration may also have a default agent. For example, one of processors 12A–12B may be a default agent for address bus arbitration. Any agent may be selected as the default agent, according to design choice.

Figure 2:
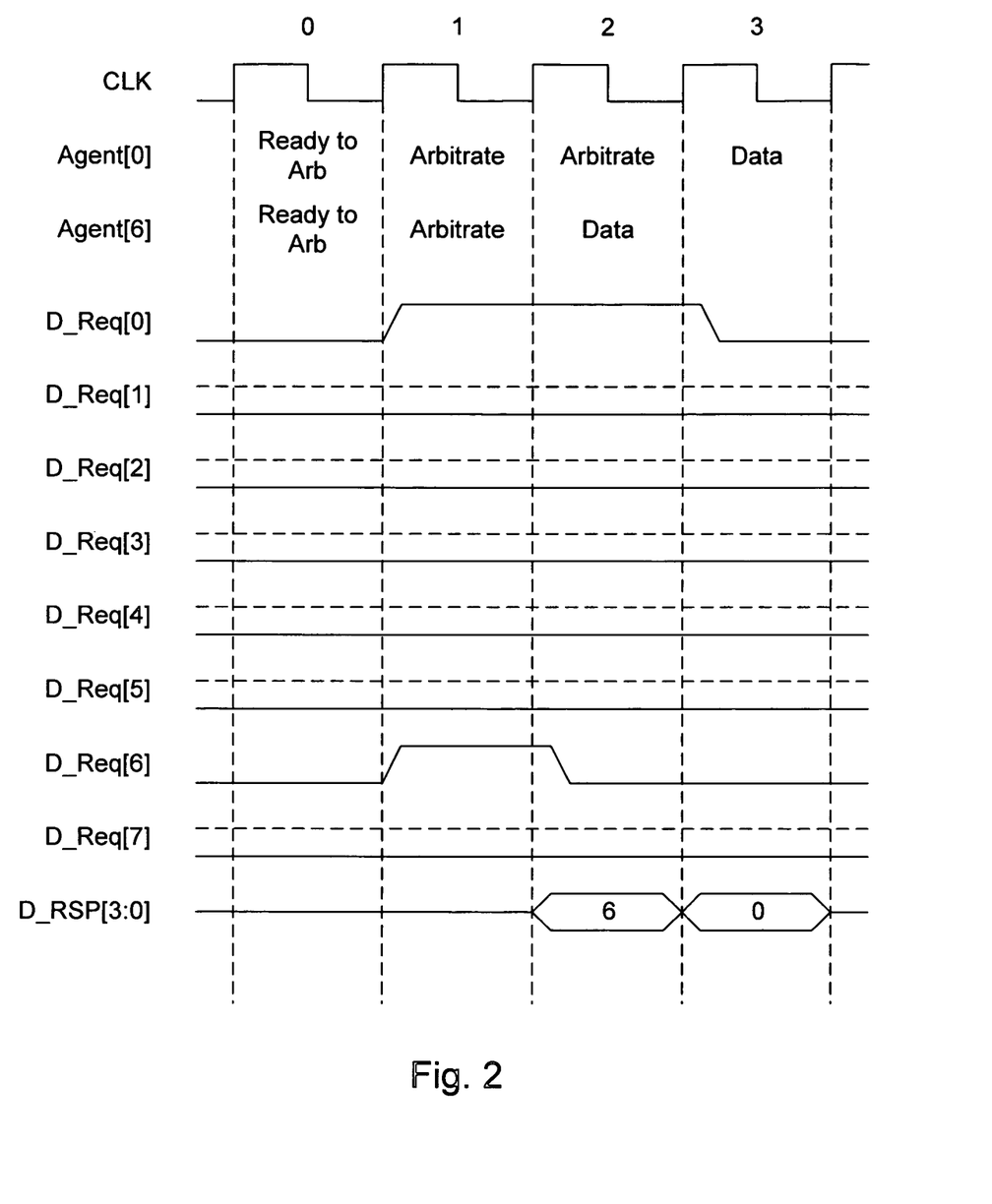
FIG. 2 is a timing diagram illustrating one embodiment of arbitration for a data bus for the system shown in FIG. 1.

Turning now to FIG. 2, a timing diagram is shown illustrating a pair of agents performing data transfers if default granting to the default agent is not performed. Clock cycles are delimited by vertical dashed lines, and each clock cycle is labeled at the top (0, 1, 2, 3).

Certain activities of the agents assigned agent identifiers 0 and 6 (represented more succinctly as agent[0] and agent[6]) are illustrated in FIG. 2, along with the data request signals (D_Req[7:0]) and the agent ID of the responding agent which is transmitting data on the data bus during a clock cycle (D_RSP[3:0]).

During bus clock cycle 0, each of agent[0] and agent[6] determines that it has data to transfer, and thus is ready to arbitrate for the data bus. In the illustrated embodiment, bus signals are driven in response to the rising edge of the bus clock signal (CLK) and are sampled in response to the falling edge of the bus clock signal. Thus, if agent[0] and agent[6] determine that they are ready to transfer data during clock cycle 0, it may be too late to assert the corresponding data request signals for the arbitration occurring in clock cycle 0. Accordingly, both agent[0] and agent[6] arbitrate for the data bus during clock cycle 1, and thus assert the corresponding D_Req[0] and D_Req[6] signals, respectively. In the illustrated example, agent[6] wins the arbitration during clock cycle 1 and drives data during clock cycle 2. Thus, D_RSP[3:0] carries agent identifier 6 during clock cycle 2. Agent[0] wins the arbitration during clock cycle 2, and drives data during clock cycle 3. Thus, D_RSP[3:0] carries agent identifier 0 during clock cycle 3.

Accordingly, agent[6] (L2 cache 14 in the above embodiment of system 10) experiences a delay of 2 clock cycles from determining that L2 cache 14 is ready to transfer data to actually transferring data. Unfortunately, since no agents arbitrated during clock cycle 0 (all D_Req[7:0] signals are deasserted in clock cycle 0), the data bus is idle during clock cycle 1. The data bus bandwidth available during clock cycle 1 is thus wasted.

Figure 3:
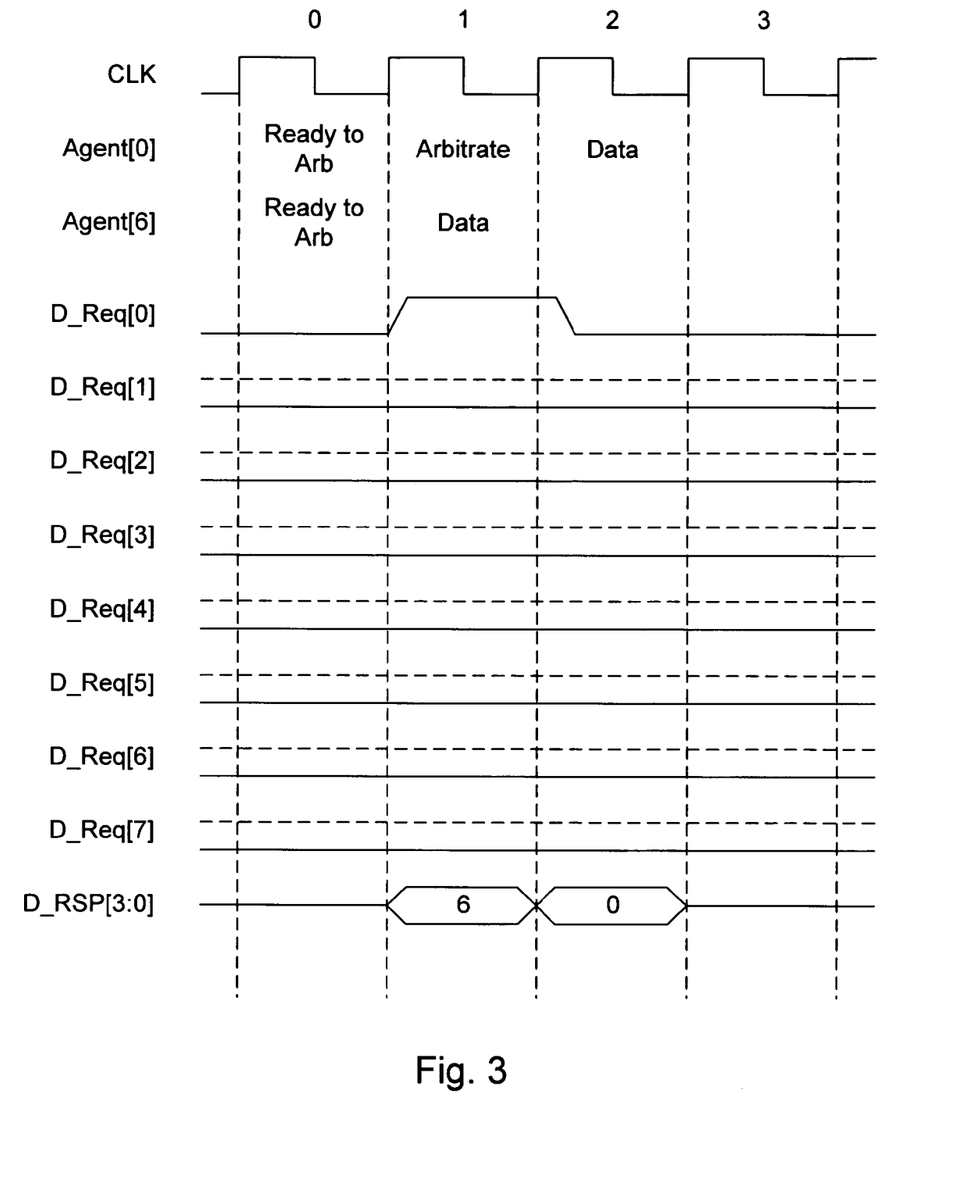
FIG. 3 is a timing diagram illustrating one embodiment of a default grant of a data bus for the system shown in FIG. 1.

FIG. 3, on the other hand, is a timing diagram similar to FIG. 2 but illustrating a pair of agents performing data transfers if default granting to the default agent is performed. Similar to FIG. 2, agent[0] and agent[6] determine that they have data to transfer on the data bus during clock cycle 0. Also, no agents are arbitrating during clock cycle 0.

Agent[6] may be the default agent for the example of FIG. 3. Thus, since no agents are arbitrating for the data bus in clock cycle 0, agent[6] may be given a default grant of the data bus. Since agent[6] has data to transfer, agent[6] may drive the data bus during clock cycle 1 (as illustrated by D_RSP[3:0] carrying agent identifier 6 in clock cycle 1). Thus, the data bus bandwidth which was wasted in clock cycle 1 in FIG. 2 is used in the example of FIG. 3 by the default agent. Accordingly, the latency of the transfer for default agent is reduced in the example. Furthermore, since agent[6] uses the default grant from clock cycle 0, agent[6] does not arbitrate during clock cycle 1. Agent[0] may therefore win the arbitration of clock cycle 1 and may transfer data in clock cycle 2 (as illustrated by D_RSP[3:0] carrying agent identifier 0 in clock cycle 2). Accordingly, in the example, the latency of agent[0] in performing its transfer may be reduced as well.

It is noted that various signals may be described herein as being asserted or deasserted. For example, the D_Req[7:0] signals have been described above as asserted or deasserted. A signal may be defined to be asserted at a high value or voltage, or at a low value or voltage, according to design choice. Furthermore, differential signals may be asserted if a positive or negative difference is detected, according to design choice. The signal may be deasserted at the opposite value, voltage, or differential.

Figure 4:
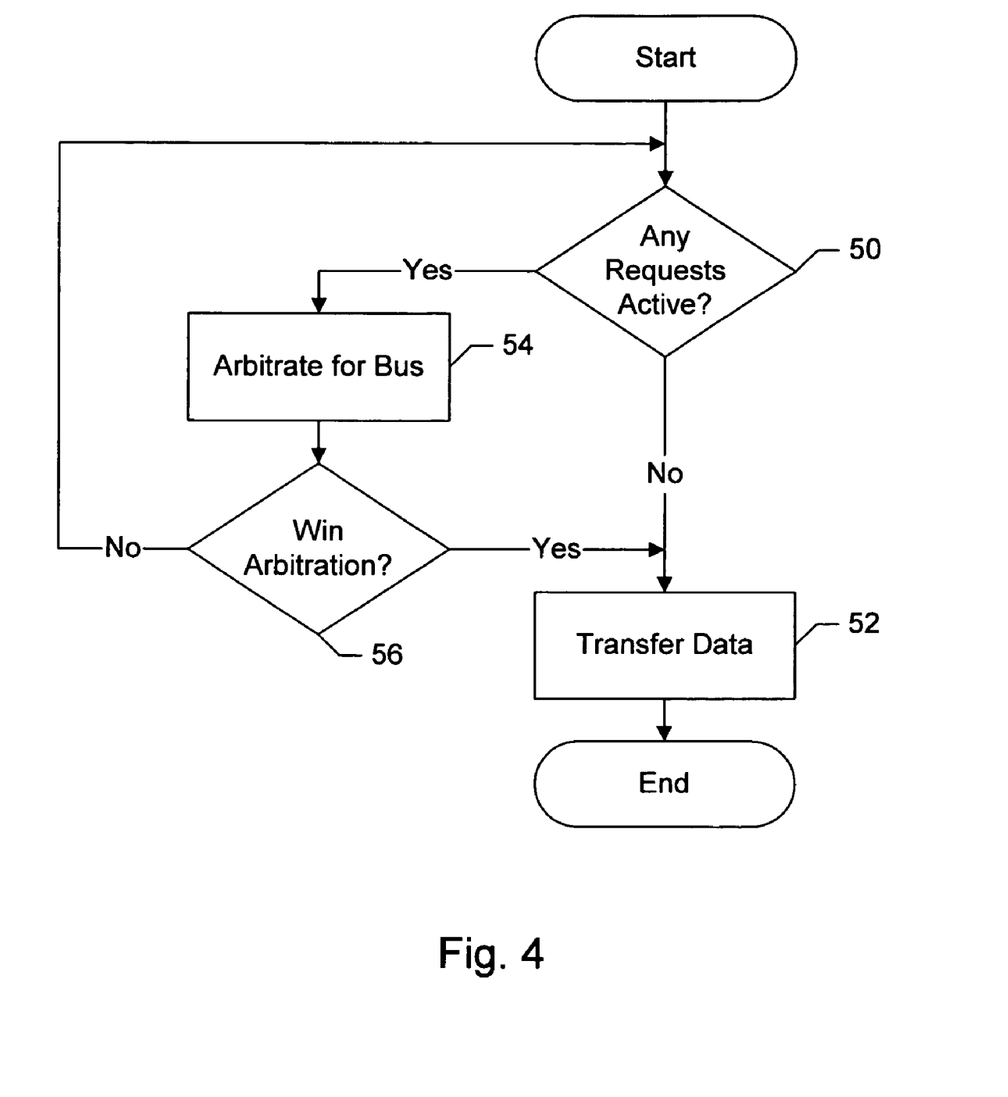
FIG. 4 is a flowchart illustrating operation of one embodiment of a bus agent which is granted the bus by default.

Turning next to FIG. 4, a flowchart is shown illustrating operation of one embodiment of a default agent (e.g. L2 cache 14) and its arbiter once the default agent determines it has data to transfer on the bus. While the blocks shown in FIG. 4 are illustrated in a particular order for ease of understanding, any suitable order may be used. Furthermore, blocks may be performed in parallel by combinatorial logic circuitry within the agent. Still further, various blocks may be performed in different clock cycles according to design choice and the protocol of the bus.

The default agent determines if any agents are requesting the bus (decision block 50). The determination may be performed by the default agent's arbiter, and may be communicated to the default agent as a default grant. If no agents are requesting the bus, the default agent may take the default grant and transfer the data (e.g. during the next bus clock cycle, in one embodiment) (block 52). On the other hand, if at least one agent is requesting the bus, the default agent may arbitrate for the bus in the next arbitration (e.g. during the next bus clock cycle, in one embodiment) (block 54). If the default agent wins the arbitration (decision block 56), the default agent may transfer the data (e.g. during the next bus clock cycle after winning the arbitration, in one embodiment) (block 52). If the default agent does not win the arbitration, the default agent may return to block 50 for the next default grant/arbitration.

Figure 5:
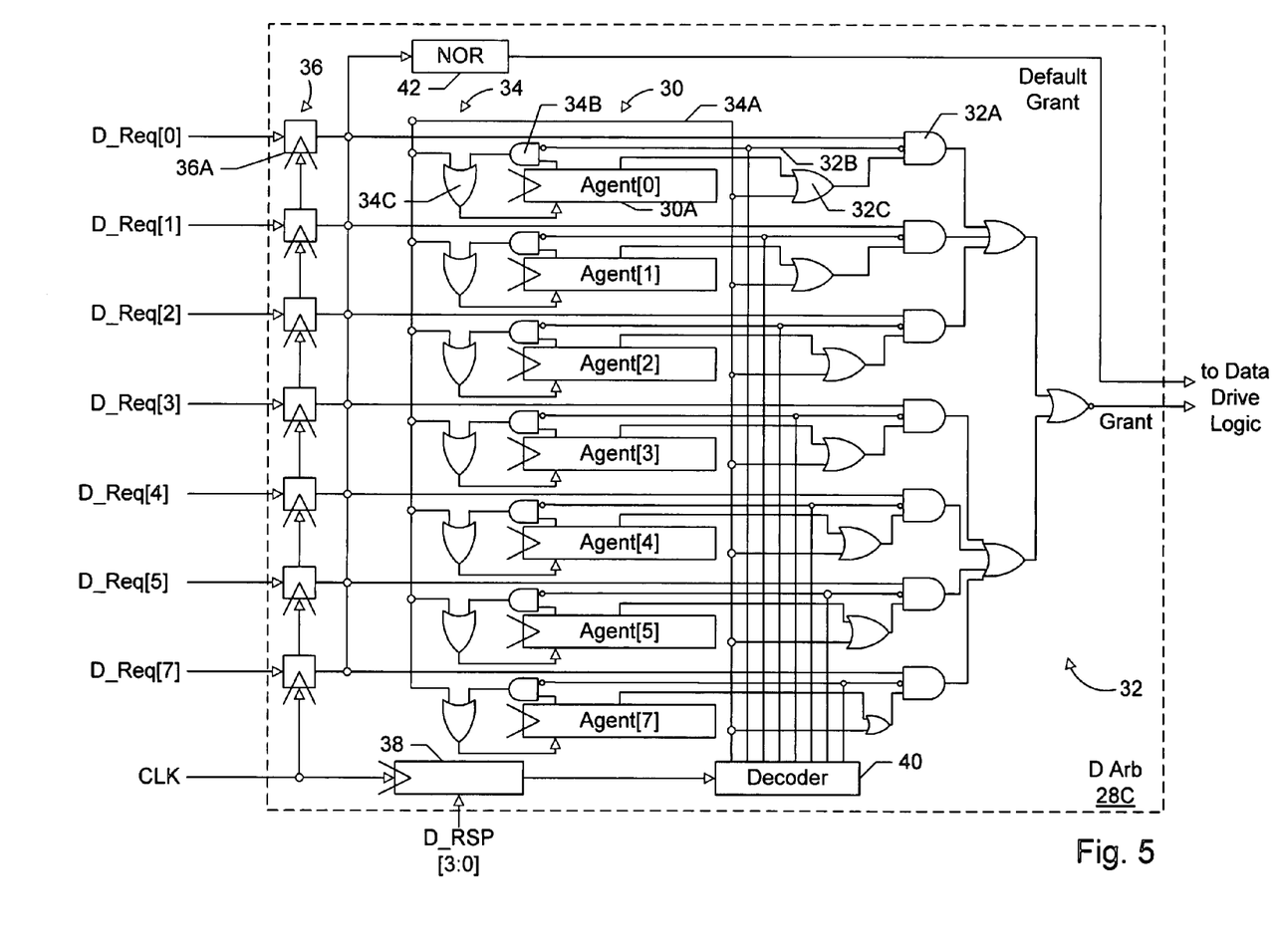
FIG. 5 is a block diagram of one embodiment of a data bus arbiter shown in FIG. 1.

Turning next to FIG. 5, a block diagram of a first embodiment of data arbiter 28C is shown. Other embodiments are possible and contemplated. In the embodiment of FIG. 5, data arbiter 28C includes priority state registers 30, a grant circuit 32, a state update circuit 34, request registers 36, an agent identifier register 38, a decoder 40, and a default grant circuit 42. Other embodiments corresponding to other agents may be similar, except they may not include default grant circuit 42. Additionally, the address arbiter for a default agent may be similar, except that the address request signals are received instead of the data request signals and a portion of the transaction ID (A_ID[9:6]) is received as the agent identifier instead of the responder ID (D_RSP[3:0]). Other address arbiters may be similar as well, but may not include default grant circuit 42. Request registers 36 are coupled to receive the data request signals (D_Req[5:0] and D_Req[7]) and are coupled to grant circuit 32. Agent identifier register 38 is coupled to receive an agent identifier from a current data phase of a transaction and is coupled to decoder 40. Both request registers 36 and agent identifier register 38 are clocked by the clock signal of bus 24 (CLK). More particularly, request registers 36 and agent identifier register 38 sample values at the falling edge of CLK. Priority state registers 30 are coupled to grant circuit 32 and state update circuit 34. Decoder 40 is coupled to grant circuit 32 and state update circuit 34. Default grant circuit 42 is coupled to request registers 36.

Generally, default grant circuit 42 determines whether or not any agents are arbitrating for the bus during the current arbitration, and asserts a default grant signal (if no agents are arbitrating) to the data drive logic in L2 cache 14 to indicate that the bus is granted by default to L2 cache 14. In response to the default grant signal, L2 cache 14 may take the data bus and transfer data, if it has data to be transferred. It is noted that, while default grant circuit 42 as illustrated in FIG. 5 does not receive the request signal corresponding to L2 cache 14 (D_Req[6]), other embodiments may receive this request signal as well. For purposes of determining the default grant, it may not matter whether L2 cache 14 itself is arbitrating. If only L2 cache 14 is arbitrating, it wins arbitration and the default grant is merely asserted at the same time as the grant from grant circuit 32. If L2 cache 14 is not arbitrating, the default grant may be asserted if no other agents are arbitrating. It is noted that, while default grant circuit 42 is illustrated as a NOR circuit (which NORs together the data request signals to produce a grant), any other circuit may be used. For example, if the data request signals were defined to be asserted low, a circuit which ANDs the signals could be used (or a NAND circuit, if the default grant signal were defined to be asserted low). As another example, if the default grant signal were defined to be asserted low, then an OR circuit could be used. Furthermore, any Boolean equivalents of the circuit may be used. Any circuit which receives the arbitration signals and determines whether or not any agent is arbitrating may be used.

Generally, priority registers 30 are configured to store a priority state indicative of which of the other agents are higher priority for data arbitration than agent[6] (L2 cache 14) and which of the other agents are lower priority for data arbitration than agent[6]. For example, the state corresponding to each other agent may be a bit indicative, when set, that the other agent is higher priority than agent[6] and indicative, when clear, that the other agent is lower priority than agent[6]. Alternatively, the bit may be indicative of lower priority when set and higher priority when clear. Each of registers 30 stores the bit corresponding to one of the other agents. For example, register 30A stores the bit corresponding to agent[0].

Generally, request registers 36 and agent identifier register 38 sample values on the data request signals and D_RSP [3:0] on the falling edge of the clock signal CLK. During the low phase of the clock signal CLK, grant circuit 32 determines whether or not agent[6] is granted the data bus. More particularly, grant circuit 32 may indicate that agent[6] is granted the data bus if no higher priority agent is requesting the bus. In the illustrated embodiment, the grant signal is generated irrespective of whether agent[6] is requesting the bus. The grant signal generated by grant circuit 32 is provided to data drive logic within agent[6] to allow the data drive logic to drive the data phase of a transaction on the next rising edge of the clock signal CLK. The data drive logic may qualify the grant with whether or not agent[6] was arbitrating for the data bus during the arbitration using D_Req[6], and may only actually drive the data bus if agent[6] was requesting the bus during the arbitration. In other embodiments, grant circuit 32 may receive the D_Req[6] signal and may only assert a grant signal to the data drive logic if agent[6] is requesting the bus. Furthermore, an embodiment is contemplated in which the default grant and the grant are combined to form a single grant signal to the data drive logic, if the grant is qualified by the data arbiter with the D_Req[6] signal.

Additionally, during the low phase of the clock signal CLK, update circuit 34 determines the next state for the priority state stored in priority state registers 30, based on the agent identifier of the current transaction. More particularly, update circuit 34 may update the priority state to indicate that the winner of the preceding arbitration (indicated by the agent identifier captured by agent identifier register 38) is lower priority than agent[6] or, if agent[6] is the winner of the arbitration, to indicate that each other agent is higher priority than agent[6]. Similarly, if the agent identifier is agent[6] due to a default grant in the preceding cycle, the priority state may be updated by update circuit 34 to indicate that each other agent is higher priority than agent[6]. In other words, for the illustrated embodiment, whether agent[6] won an arbitration or was default granted the bus may not affect the state update. Other embodiments may not update the state for default grants, if desired. A more detailed discussion of the grant and update circuits with respect to the priority state of agent[0] is next described. The circuitry may be similar for the other agents (1–5 and 7).

Request register 30A captures the data request signal for agent[0] (D_Req[0]) and provides the data request signal to an AND gate 32A. Additionally, decoder 40 decodes the agent identifier received by agent identifier register 38. Decoder 40 produces a signal corresponding to each agent, asserting the signal if the agent identifier identifies that agent. Thus, for example, signal 32B may be asserted if the agent identifier indicates agent[0]. Signal 34A may be asserted if the agent identifier identifies agent[6]. Other signals correspond to the remaining agents (1–5 and 7), as illustrated in FIG. 5. Signal 32B is provided to AND gate 32A as well. Finally, the priority state bit corresponding to agent[0] is provided by priority state register 30A to an OR gate 34C, which also receives signal 34A. The output of OR gate 34C is provided to AND gate 32A.

Agent[0] prevents agent[6] from winning the arbitration if: (i) agent[0] is requesting the bus, (ii) agent[0] is higher priority than agent[6] (including if agent[6] won the prior arbitration), and (iii) agent [0] is not the agent which won the preceding arbitration (as indicated by the assertion of signal 32B). On the other hand, agent[0] does not prevent agent[6] from winning the arbitration if: (i) agent[0] is not requesting the bus, or (ii) agent[0] is lower priority than agent[6], or (iii) agent[0] won the preceding arbitration. Thus, OR gate 32C ORs the signal 34A (indicating that agent[6] won the preceding arbitration and therefore agent[0] is higher priority than agent[6] in the current arbitration) with the current priority state for agent[0] from priority register 30A. AND gate 32A ANDs the inversion of signal 32C with the request signal for agent[0] and the priority state of agent[0] as calculated by OR gate 32C. If AND gate 32A asserts its output signal, then agent[6] does not win the current arbitration (agent[0] may win or some other higher priority agent may win). Accordingly, the output signal of AND gate 32A is NORed with the output signals of other AND gates corresponding to the other agents to produce the grant signal.

Figure 6:
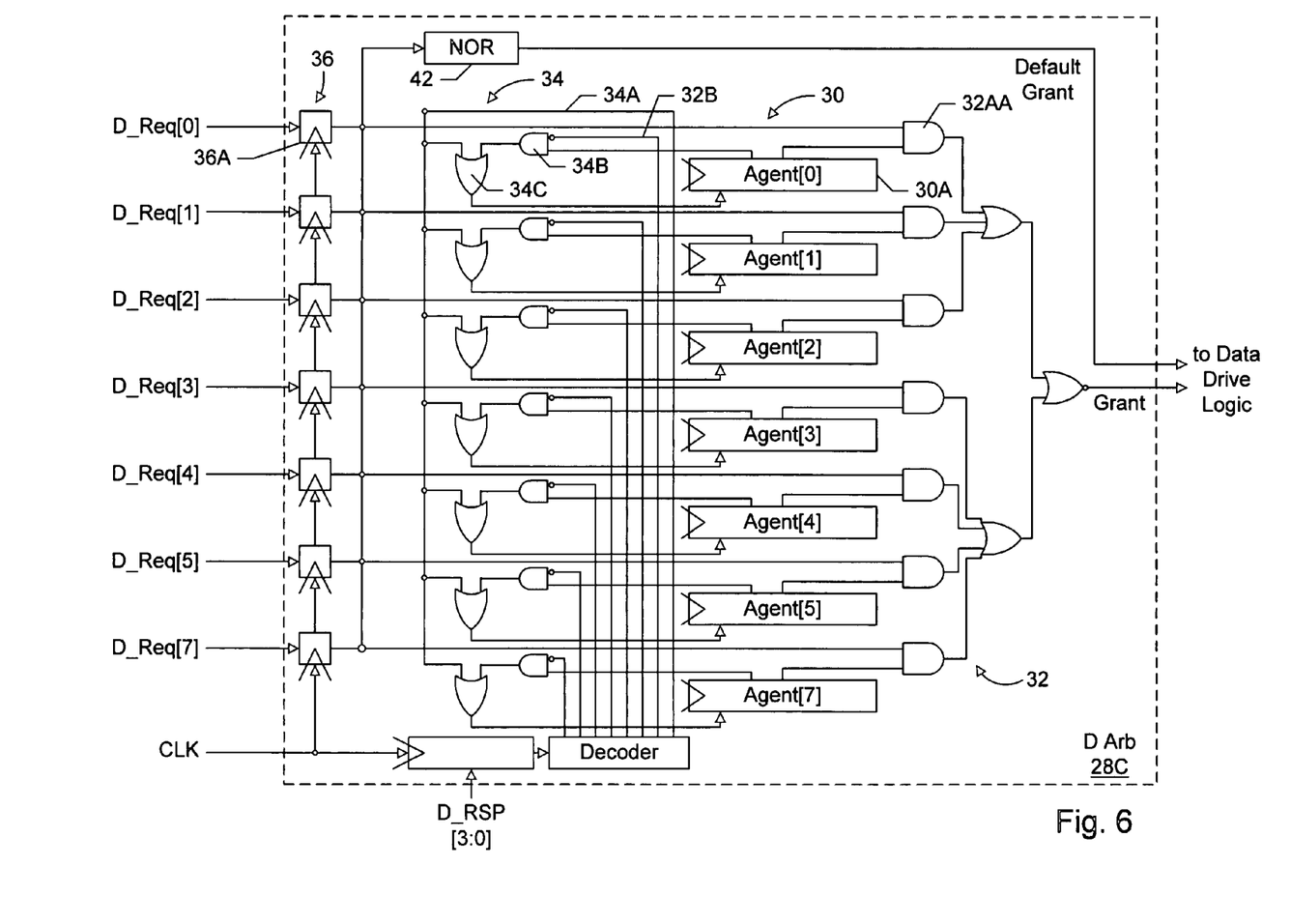
FIG. 6 is a block diagram of another embodiment of a data bus arbiter shown in FIG. 1.

In the illustrated embodiment, the winner of the preceding arbitration is provided (via the agent identifier) at the same time that the current arbitration is being performed. Thus, to ensure that the preceding winner (which may still be marked as higher priority in priority state registers 30 during the current arbitration, since the update state is being calculated in parallel) does not win the arbitration again, the signal corresponding to each agent from decoder 40 is included in the grant calculation by grant circuit 32 and OR gates similar to OR gate 32C are provided to update the priority state for the current arbitration. However, alternative embodiments may choose not to include the preceding winner in the grant calculation. Such an embodiment is illustrated in FIG. 6. In FIG. 6, the winner of the preceding calculation is still used by state update circuit 34 to update the priority state, but is not factored into the grant determination. Accordingly, the fairness of the arbitration for the embodiment of FIG. 6 is slightly lower, since the highest priority agent could win the arbitration two cycles in a row. However, the scheme is still relatively fair, and the grant circuit 32 illustrated in FIG. 6 may operate more rapidly since fewer inputs are used to generate the grant. For example, AND gate 32AA in FIG. 6 may be similar to AND gate 32A, but includes only the priority bit from register 30A and the request signal from request register 36A as inputs.

In parallel with grant circuit 32 determining whether or not agent[6] wins the current arbitration, update circuit 34 updates the priority state based on the preceding arbitration winner, as indicated by the agent identifier captured by agent identifier register 38. More particularly, for the update of the priority bit corresponding to agent[0], an AND gate 34B and an OR gate 34C are used to generate the next state. AND gate 34B receives the current priority bit for agent[0] from priority register 30A, and signal 32B from decoder 40. OR gate 34C receives the output of AND gate 34B and signal 34A (corresponding to a decode of the agent identifier corresponding to agent[6]).

AND gate 34B provides the current state of the priority bit as an input to OR gate 34B unless signal 32B is asserted (indicating that agent[0] won the preceding arbitration), in which case AND gate 34A provides a binary zero input to OR gate 34B. Additionally, signal 34A is asserted if agent[6] won the preceding arbitration.

Accordingly, the priority bit corresponding to agent[0] is set (indicating higher priority than agent[6]) if agent[6] won the preceding arbitration. The priority bit is cleared if agent[0] won the preceding arbitration. Otherwise, the state of the priority bit is not changed. Signal 34A further causes each other priority bit in priority registers 30 to be set, causing agent[1] to be the lowest priority arbiter when agent[1] wins the arbitration. Other priority bits may also be cleared when the corresponding agent wins the arbitration, using gates similar to gates 34B–34C.

Not shown in FIG. 5 is reset circuitry to establish a reset state for the priority state. Each of the data arbiters resets to a priority state which is consistent with the priority state in the other data arbiters, to ensure that only one agent wins each arbitration. In one embodiment, the priority state for a given data arbiter is reset to indicate that each lower-numbered agent is higher priority than the agent to which the given data arbiter corresponds and to indicate that each higher-numbered agent is lower priority than the agent to which the given data arbiter corresponds. For example, the data arbiter in FIG. 5 is for agent[6], and thus the reset priority state for the data arbiter shown in FIG. 5 indicates that agent[0], agent[1], agent[2], agent[3], agent[4], and agent[5] are higher priority than agent[6] and that agent[7] is lower priority than agent[6]. In another embodiment, the priority state for a given address arbiter is reset to indicate that each lower-numbered agent is lower priority than the agent to which the given data arbiter corresponds and to indicate that each higher-numbered agent is higher priority than the agent to which the given data arbiter corresponds.

It is noted that, in the illustrated embodiment, the winner of the arbitration takes control of the bus in the next consecutive clock cycle. In other embodiments, one or more clock cycles of delay may occur between the arbitration and the corresponding address transfer, if desired.

It is further noted that, while specific logic gates are illustrated in FIGS. 5 and 6 for ease of understanding, the illustrated logic is merely exemplary. Any set of logic gates may be used to perform the described functions. Specifically, any Boolean equivalents of the illustrated logic may be used. Still further, similar logic circuits using different gates may be used depending upon whether the request signals are active high or active low and depending on whether the grant signal is active high or active low. For example, if the request signals were active low, AND gates 32A and 32AA may have inverting inputs for the request signal.

As used herein, the term "register" is used to refer to any clocked storage device. For example, a register may be a flip-flop (or "flop"), a latch, a series of latches, a clocked random access memory (RAM) cell, or any other desirable storage. Additionally, although priority registers 30 and request registers 36 are illustrated as separate registers per agent in FIGS. 5 and 6, priority registers 30 may be implemented as a single register having multiple bits corresponding to the various agents and request registers 36 may be implemented as a single register having multiple bits corresponding to the various agents as well.

Figure 7:
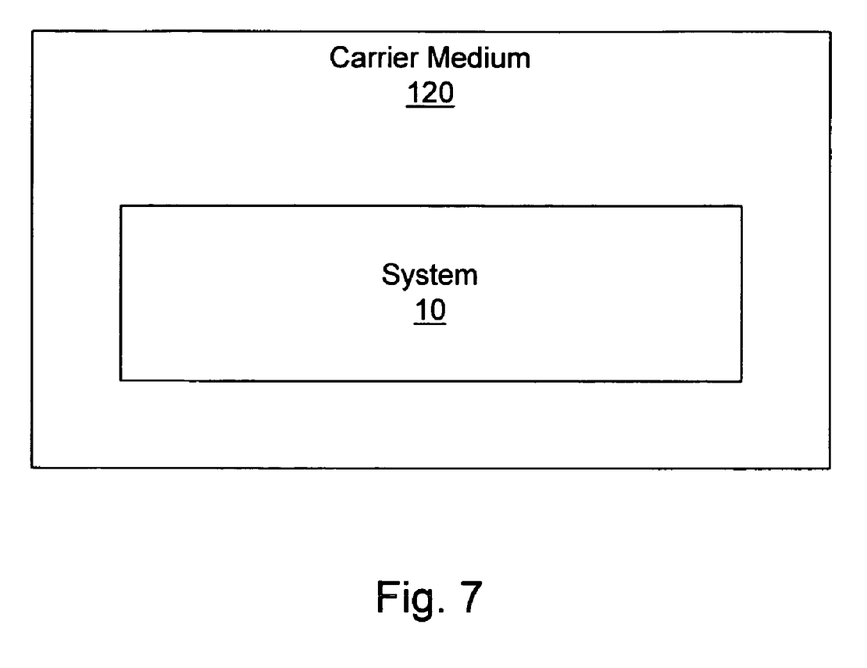
FIG. 7 is a block diagram of one embodiment of a carrier medium including a representation of the system shown in FIG. 1.

Turning next to FIG. 7, a block diagram of a carrier medium 120 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 120 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 120 may be the netlist (with or without the synthesis library) or the data set, as desired.

While carrier medium 120 carries a representation of system 10, other embodiments may carry a representation of any portion of system 10, as desired, including any set of one or more agents (e.g. processors, L2 cache, memory controller, etc.) or circuitry therein (e.g. arbiters, etc.), etc.

Numerous variations and modifications will become apparent to those skilled in the art once the above disclosure is fully appreciated. It is intended that the following claims be interpreted to embrace all such variations and modifications.

What is claimed is:

1. A system comprising:

a bus; and a plurality of agents coupled to said bus, in which each of said plurality of agents is configured to arbitrate for said bus using an arbitration priority scheme, but wherein only one of said plurality of agents is selected as a predetermined default agent to be alone given default grant of said bus independent of the arbitration priority scheme, if no other of said plurality of agents arbitrates for said bus, said default agent to also be an arbitration participant with other ones of said plurality of agents when arbitrating using the arbitration priority scheme, and in which said default agent is changed to a lower priority in the arbitration priority scheme in response to using said bus by default grant, but said default agent to always maintain its status to be given default grant of said bus, even after other agents win arbitration of said bus.

2. The system as recited in claim 1 further comprising a plurality of request signals, each of the plurality of request signals corresponding to a respective agent of said plurality of agents and used by said respective agent to indicate whether or not said respective agent is arbitrating for said bus, and wherein said default agent is coupled to receive at least one of the plurality of request signals corresponding to other ones of said plurality of agents, and wherein said default agent is configured to determine if none of said plurality of agents is arbitrating responsive to the plurality of request signals.

3. The system as recited in claim 1 wherein said bus is a split transaction bus including an address bus and a data bus, and wherein said default agent is to be given default grant of said data bus responsive to no other of said plurality of agents arbitrating for said data bus.

4. The system as recited in claim 1 wherein said default agent is configured to use said bus responsive to being given default grant, only if said default agent has information to transfer on said bus.

5. The system as recited in claim 1 wherein said default agent is configured to arbitrate for said bus using the arbitration priority scheme if at least one other of said plurality of agents is arbitrating for said bus and said default agent has information to transfer on said bus.

6. The system as recited in claim 1 further comprising one or more arbiters configured to perform arbitration, wherein said one or more arbiters are configured to maintain a state indicative of priority of said plurality of agents, and wherein an agent winning an arbitration is changed to lowest priority in the arbitration priority scheme.

7. An arbiter for a bus comprising:
a first circuit coupled to receive a plurality of request signals, each of the plurality of request signals corresponding to a respective agent of a plurality of agents coupled to said bus and indicative of whether or not said respective agent is arbitrating for said bus using an arbitration priority scheme, wherein said first circuit is configured to grant default use of said bus independent of the arbitration priority scheme to a predetermined default agent selected as an only agent from said plurality of agents for lone use of the default grant, if no other of said plurality of agents is arbitrating for said bus, said default agent to also be an arbitration participant with other ones of said plurality of agents when arbitrating using the arbitration priority scheme, and in which said default agent is changed to a lower priority in the arbitration priority scheme in response to using said bus, but said default agent to always maintain its status to be given default grant of said bus, even after other agents win arbitration of said bus.

8. The arbiter as recited in claim 7 wherein said bus is a split transaction bus including an address bus and a data bus, and wherein said default agent is granted use of said data bus responsive to none of said plurality of agents arbitrating for said data bus.

9. The arbiter as recited in claim 7 further comprising a second circuit configured to determine if said default agent wins an arbitration for said bus if at least one of said plurality of agents is arbitrating for said bus, and wherein said second circuit is configured to determine if said default agent wins arbitration according to the arbitration priority scheme.

10. The arbiter as recited in claim 9 further comprising a storage coupled to said second circuit, said storage to store an indication of priority of other ones of said plurality of agents to said default agent, and wherein a winner of said arbitration is updated to lowest priority.

11. A method comprising:
selecting a predetermined default agent as an only agent from a plurality of agents to have default grant of a bus independent of an arbitration priority scheme used by said plurality of agents;
granting default use of said bus to said default agent responsive to none of said plurality of agents arbitrating for said bus using the arbitration priority scheme, wherein said default agent is also an arbitration participant with other ones of said plurality of agents using the arbitration priority scheme to arbitrate for said bus;
using said bus by said default agent in response to obtaining default grant of said bus;
changing priority of said default agent after using said bus, said default agent changed to a lower priority in said arbitration priority scheme; and
maintaining always for said default agent its status to be granted default use of said bus independent of arbitrations granted by the arbitration priority scheme to the plurality of agents, even after other agents win arbitration of said bus.

12. The method as recited in claim 11 further comprising:
receiving a plurality of request signals, each of said plurality of request signals corresponding to a respective agent of said plurality of agents and indicative of whether or not said respective agent is arbitrating for said bus; and
determining that none of said plurality of agents is arbitrating responsive to the plurality of request signals.

13. The method as recited in claim 11 wherein said bus is a split transaction bus including an address bus and a data bus, and wherein said granting comprises granting default use of said data bus to said default agent.

14. The method as recited in claim 11 further comprising using said bus by said default agent only if said default agent has information to transfer on said bus.

15. The method as recited in claim 14 further comprising arbitrating for said bus by said default agent if one or more of said plurality of agents are arbitrating.

16. The method as recited in claim 15 further comprising determining a winner of an arbitration according to the arbitration priority scheme.

17. A computer-readable medium comprising a database which when operated upon by a program executable on a computer system is used to fabricate an integrated circuit, the integrated circuit including:
a bus; and
a plurality of agents coupled to said bus, in which each of said plurality of agents is configured to arbitrate for said bus using an arbitration priority scheme, but wherein only one of said plurality of agents is selected as a predetermined default agent to be alone given default grant of said bus independent of the arbitration priority scheme, if no other of said plurality of agents arbitrates for said bus, said default agent to also be an arbitration participant with other ones of said plurality of agents when arbitrating using the arbitration priority scheme, and in which said default agent is changed to a lower priority in the arbitration priority scheme in response to using said bus by default grant, but said default agent to always maintain its status to be given default grant of said bus, even after other agents win arbitration of said bus.

18. The computer-readable medium as recited in claim 17 wherein said bus is a split transaction bus including an address bus and a data bus, and wherein said default agent is to be given default grant of said data bus responsive to no other of said plurality of agents arbitrating for said data bus.

19. The computer-readable medium as recited in claim 17 wherein said default agent is configured to use said bus responsive to being given default grant, only if said default agent has information to transfer on said bus.

20. The computer-readable medium as recited in claim 17 further comprising one or more arbiters configured to perform arbitration, wherein said one or more arbiters are configured to maintain a state indicative of priority of said plurality of agents, and wherein an agent winning an arbitration is changed to lowest priority in the arbitration priority scheme.

21. A computer-readable medium comprising a database which when operated upon by a program executable on a computer system is used to fabricate an integrated circuit, the integrated circuit including:
a first circuit coupled to receive a plurality of request signals, each of said plurality of request signals corresponding to a respective agent of a plurality of agents coupled to said bus and indicative of whether or not said respective agent is arbitrating for said bus using an arbitration priority scheme, wherein said first circuit is configured to grant default use of said bus independent of the arbitration priority scheme to a predetermined default agent selected as an only agent from said plurality of agents for lone use of the default grant, if no other of said plurality of agents is arbitrating for said bus, said default agent to also be an arbitration participant with other ones of said plurality of agents when arbitrating using the arbitration priority scheme, and in which said default agent is changed to a lower priority in the arbitration priority scheme in response to using said bus, but said default agent to always maintain its status to be given default grant of said bus, even after other agents win arbitration of said bus.

22. The computer-readable medium as recited in claim 21 wherein said bus is a split transaction bus including an address bus and a data bus, and wherein said default agent is granted use of said data bus responsive to no other of said plurality of agents arbitrating for said data bus.

23. The computer-readable medium as recited in claim 21 further comprising a storage configured to store an indication of priority of other ones of said plurality of agents to said default agent, and wherein a winner of said arbitration is updated to lowest priority.

24. The system as recited in claim 1 wherein said default agent is configured to drive said bus responsive to being given default grant even if said default agent has no information to transfer on said bus.

25. The system as recited in claim 1 wherein priority is changed in response to any one of the plurality of agents using said bus.

26. The system as recited in claim 25 wherein one of said plurality of agents using said bus is changed to a lowest priority.

27. The arbiter as recited in claim 7 wherein priority is changed in response to any one of the plurality of agents using said bus.

28. The arbiter as recited in claim 27 wherein one of said plurality of agents using said bus is changed to a lowest priority.

29. The method as recited in claim 11 further comprising driving said bus by said default agent in response to being given default grant even if said default agent has no information to transfer on said bus.

30. The computer-readable medium as recited in claim 17 wherein said default agent is configured to drive said bus responsive to being given default grant even if said default agent has no information to transfer on said bus.

31. The computer-readable medium as recited in claim 17 wherein priority is changed in response to any one of the plurality of agents using said bus.

32. The computer-readable medium as recited in claim 31 wherein one of said plurality of agents using said bus is changed to a lowest priority.

33. The computer-readable medium as recited in claim 21 wherein priority is changed in response to any one of the plurality of agents using said bus.

34. The computer-readable medium as recited in claim 33 wherein one of said plurality of agents using said bus is changed to a lowest priority.

* * * * *